United States Patent

[11] 3,564,222

[72] Inventors Salvatore J. DiPaolo Hackensack; Casimir S. Smialowicz, Livingston, N.J.
[21] Appl. No. 741,620
[22] Filed July 1, 1968
[45] Patented Feb. 16, 1971
[73] Assignee The Bendix Corporation

[54] DIGITAL FUNCTION GENERATOR SOLVING THE EQUATION F(X)=MX+B
9 Claims, 3 Drawing Figs.

[52] U.S. Cl. .......... 235/152, 235/197
[51] Int. Cl. .......... G06f 7/38, G06f 15/34
[50] Field of Search .......... 235/152, 150.53, 197, 156, 164

[56] References Cited

UNITED STATES PATENTS

| | | | |
|---|---|---|---|
| 3,164,807 | 1/1965 | Reque | 235/150.53X |
| 3,247,365 | 4/1966 | Dell et al. | 235/152X |
| 3,345,505 | 10/1967 | Schmid | 235/197 |

OTHER REFERENCES

Wang 370 Calculating System Reference Manual Vol. 1, Page 5— 8, Sept. 1967

*Primary Examiner*—Malcolm A. Morrison
*Assistant Examiner*—David H. Malzahn
*Attorneys*—S. H. Hartz and Plante, Hartz, Smith & Thompson

ABSTRACT: The novel air data computer constructed according to the present invention has digital means which utilizes linear approximation techniques for computing air data parameters from air data curves. For each parameter the computer retrieves a slope $m$ and an intercept $b$ corresponding to a selected linear segment of an air data curve from a permanent memory and repetitively adds the retrieved slope $m$ under control of an independent variable $x$ corresponding to a sensed condition until the sum of the slopes equals the product $mx$ of the slope and independent variable. The computer further adds the intercept $b$ to the product $mx$ in accordance with the following equation to provide a sum which is the dependent variable $y$ corresponding to a point on an air data curve:

$$y = mx + b \qquad (1)$$

The computer also solves equation (1) when $b$ is negative.

INVENTORS
SALVATORE J. DI PAOLO
CASIMIR S. SMIALOWICZ
BY
ATTORNEY

INVENTORS
SALVATORE J. DI PAOLO
CASIMIR S. SMIALOWICZ
BY
ATTORNEY

INVENTORS
SALVATORE J. DI PAOLO
CASIMIR S. SMIALOWICZ
BY
ATTORNEY

DIGITAL FUNCTION GENERATOR SOLVING THE EQUATION F(X) = MX + B

BACKGROUND OF THE INVENTION

1. Field of the Invention

The invention relates to air data computers and, more particularly, to a digital air data computer.

2. Description of the Prior Art

Prior to the present device, air data computers were of the analogue computer type utilizing either electromechanical or pneumatic-electrical devices. The present device using solid-state electronic devices achieves faster computation rates, higher reliability, with less bulk and weight. The improvement in computation rate, reliability, bulk and weight is extremely important since the present device functions in an aircraft where bulk and weight need to be minimized and reliability and speed of computations need to be maximized.

SUMMARY OF THE INVENTION

A digital air data computer for computing air data parameters including altitude, rate of climb, true air speed, indicated air speed, free air temperature, air density and angle of attack from sensed air condition. A programmer selects the digital information corresponding to sensed air conditions and transfers that information to a first register and said information represents the independent variable $x$ in equation (1). The programmer commands a permanent memory to provide a particular slope $m_1$ and an intercept $b_1$ of a particular linear segment, for transfer to second and third registers, respectively. In response to signals from the programmer, the content of the first register is shifted to a fourth register. Upon command from the programmer, the content of the second register is added to the content of the first register in an adder/subtractor. The content of the first register initially is zero due to the original content being shifted to the fourth register. The addition is repeated under the control of the programmer and the fourth register until termination of the command by the programmer. The first register and a fourth register, combined as one register, contains the sum of the repetitive addition of the content of the second register which is equivalent to the multiplication of the slope parameter with the independent variable parameter. The programmer applies another command to the first and third registers and the adder/subtractor causing the content of the third register to be added to the content of the first register so that the combined first and fourth registers contain the binary word representing a point $y_1$ on an air data curve. The adder/subtractor is capable of subtracting quantities for further air data calculation.

One object of the present device is to provide digital computation of air data parameters by approximating air data curves using linear segments.

Another object of the device is to provide increased reliability and less bulk and weight by using only solid state electronic components.

Another object of the present device is to provide increased accuracy in the calculation of air data.

Another object of the present device is to provide faster computation of air data.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

In the drawings in which corresponding numerals indicate corresponding parts in their respective figures.

DESCRIPTION OF THE INVENTION

Figure 1:
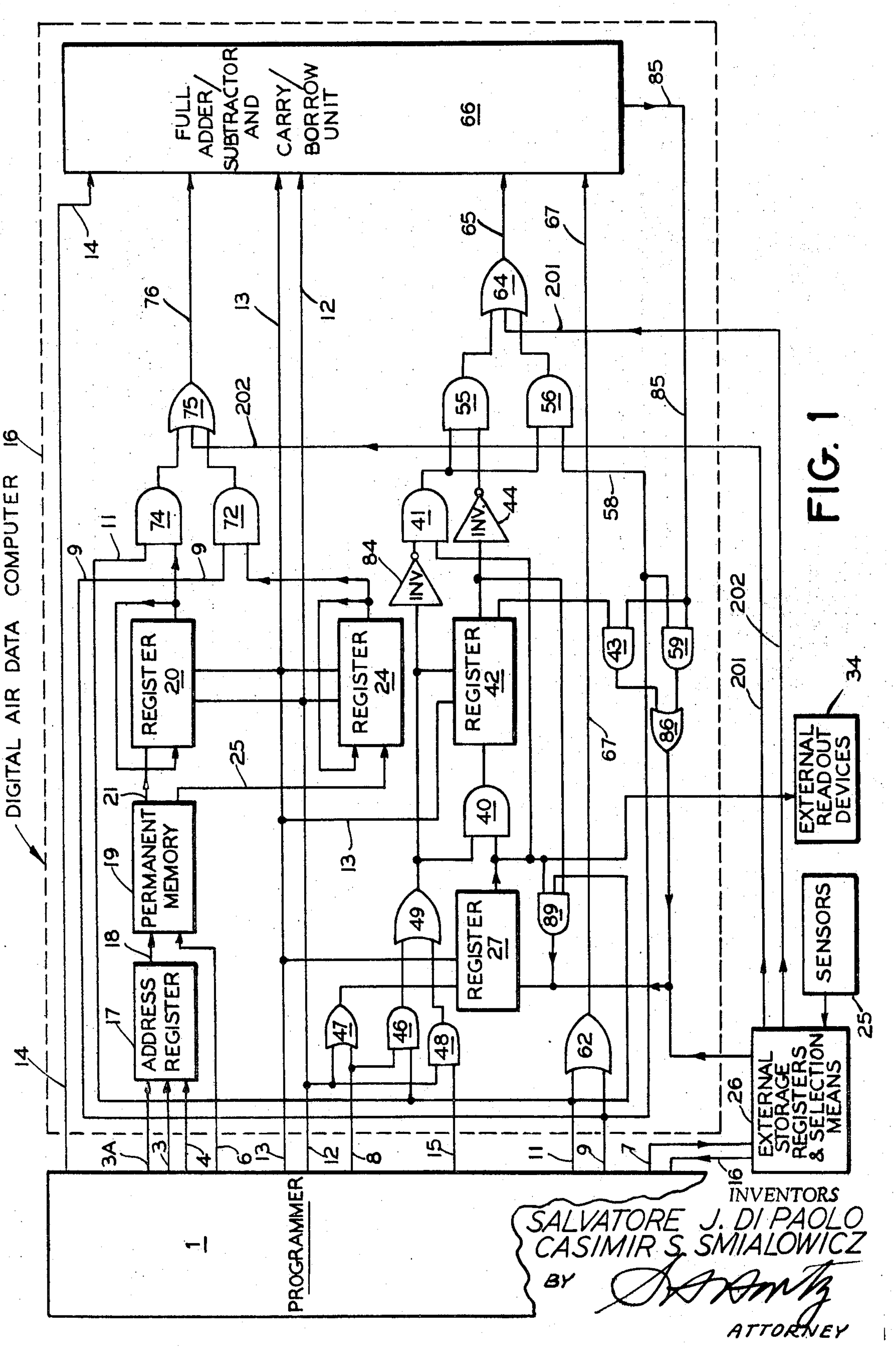
FIG. 1 is a block diagram showing one embodiment of the present invention.

Referring to FIG. 1, there is shown a programmer 1 having output conductors 3, 3A, 4, 6, 7, 8, 9, 11, 12, 13, 14 and 15 and an input conductor 16. Programmer 1 may be, for purposes of illustration, a conventional programmer having internal permanent memory means, timing controls and circuitry for providing appropriate commands to a digital air data computer 16. The commands are in the form of constant level DC outputs at conductors 9, 11, 14 and 15, single pulses at conductors 6, 8 and 13 and pulse trains at conductors 3, 3A, 4, 7 and 12.

A set section input and a clear section input of an input flip-flop of an address register 17 is connected to output conductors 3 and 3A, respectively. Register 17 is a multistage register similar to the four stage register described at pages 344 and 345 of Pulse, Digital and Switching Waveforms, Millman and Taub, McGraw-Hill Book Company 1965 and provides for the parallel transfer of address commands which are in serial form. Conductor 4 is connected to register 17 and applies a pulse train from the programmer 1 to shift a digital word into register 17. Register 17 is connected to a permanent memory device 19 by a conductor 18 representing an even number of conductors, each conductor connecting the output of a set section or a clear section of one stage of register 17.

The number of stages in register 17 is determined by the quantity of information that has to be stored in the memory 19. For purposes of illustration, register 17 will be regarded as a three-stage register. A conductor 6 connects programmer 1 to the memory 19.

Figure 2:
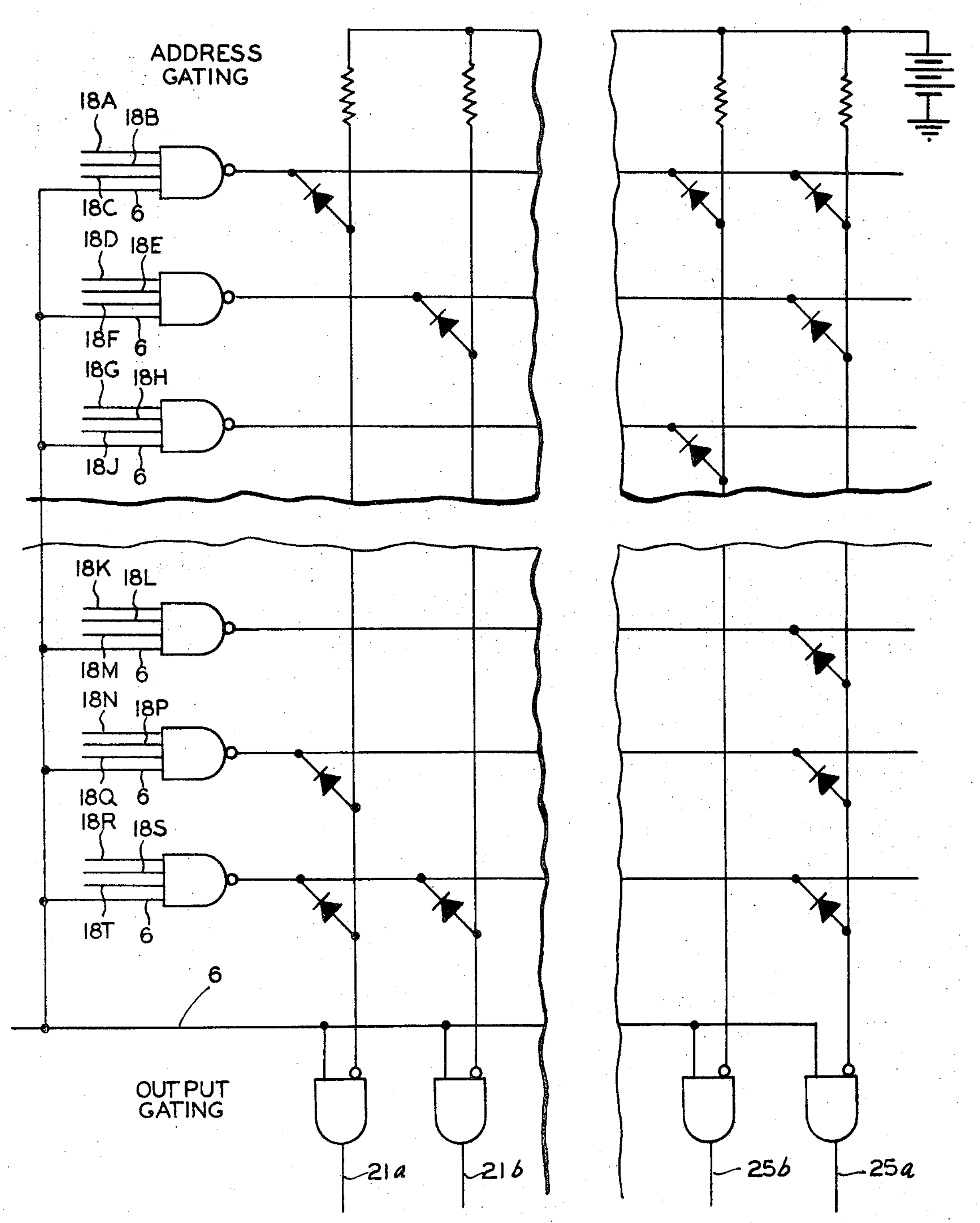
FIGS. 2 and 3 are schematic diagrams of the permanent memory and full adder/subtractor shown in FIG. 1.

The permanent memory 19 may be of a diode matrix type as shown in FIG. 2 having a quantity of NAND gates at its inputs referred to as the address gating. The quantity of NAND gates is equal to $2^n$ where $n$ is the number of stages in register 17. Since register 17 has three stages, for purposes of illustration, the quantity of NAND gates is eight. The quantity of inputs to each NAND gate is equal to $n + 1$ where $n$ is the number of stages in register 17. The address gating permits only one line in the memory to be selected in response to an address command thus preventing ambiguous outputs from the memory 19. One input of each NAND gate in the memory 19 is connected to conductor 6. The slope and intercept for the aforenoted equation (1) are stored in the memory 19.

An input to the set section of each stage of a slope register 20 is connected to an output of the memory 19 as indicated by a conductor 21 representing 17 conductors. Register 20 is a conventional shift register having, for purposes of illustrations, 17 stages. An output of register 20 is applied to an AND gate 74 and to an input to the input stage of register 20 thereby permitting the content of register 20 to be recirculated instead of being lost after each pulse train is applied to register 20. Inputs to set and clear sections of each stage are connected to conductor 12 for shifting the content of register 20. An input to the clear section of each stage is connected to conductor 13 for clearing the content of register 20. An input to the set section of each stage of an intercept register 24 is connected to an output of the memory 19 as indicated by a conductor 25 representing 17 conductors. An output of register 24 is applied to an AND gate 72 and to an input to an input stage of register 24 thereby permitting the content of register 24 to be recirculated instead of being lost after each pulse train applied to register 24. Inputs to set and clear sections of each stage are connected to conductor 12 for shifting the content of register 24. An input to the clear section of each stage of register 24 is connected to conductor 13 for clearing register 24.

Since register 20 and register 24 have 17 stages each, there are 34 two-input AND gates in memory 19 and the gates are referred to as the output gating. The output gating of the memory 19 provides simultaneous transfer of information to registers 20 and 24 thereby preventing miscalculations resulting from one register racing ahead of the other register.

Sensors 25 may include conventional sensors such as a static pressure sensor and is connected to external storage registers and selection means 25. Output conductor 7 and input conductor 16 represents a plurality of conductors connecting programmer 1 to the external storage registers and selection means 26. Means 26 may be, for purposes of illustration, a bank of registers, storing binary data corresponding to sensed condition of an outer environment of an aircraft, along with selection means that permits the selection of certain registers and transferring their contents to the digital air data computer 16 upon command from programmer 1.

An output of means 26 is applied to an input to an independent variable register 27. Register 27 is of a type of register similar to register 20; however, an output is fed back to an input to register 27 through an AND gate 89 as shown in FIG. 1 and causes register 27 to be a conditional recirculatory register and only recirculates its content for the conditions hereinafter explained. Inputs to set and clear sections of each stage of register 27 are connected to an OR gate 47 for shifting register 27. An input to the clear section of each stage of register 27 is connected to conductor 13 for clearing register 27.

A readout device 34 and AND gates 40 and 41 are connected to the output of register 27. The readout device 34, for purposes of illustration, may be of a type having an internal storage register and visual display. AND gate 40 controls the transfer of the content of register 27 into a register 42.

The output of AND gate 40 is applied to an input stage of register 42. Register 42 is a 16 stage shift register of a type similar to register 20. However, register 42 does not have a feedback loop from the output stage to the input stage and cannot recirculate its content. Inputs to set and clear inputs of each stage of register 42 are connected to an OR gate 49. Inputs to the clear section of each stage of register 42 are connected to conductor 13 for clearing register 42. A first output of register 42 is applied to an AND gate 43 and a second output, of opposite polarity to the first output, is applied to an inverter 44.

The output conductor 8 of the programmer 1 is connected to an AND gate 46 and to the OR gate 47. Output conductor 15 of programmer 1 is connected to an AND gate 48 whose output is applied to the OR gate 49 along with the output of the AND gate 46. Inputs to OR gate 47 and AND gate 48 are connected to conductor 12. The output of OR gate 49 is applied to AND gate 40 and to the input stage of register 42 as heretofore explained. The output of inverter 44 is applied to an AND gate 55.

The output of AND gate 41 is applied to AND gates 55 and 56. Output conductor 9 connects programmer 1 to AND gates 56 and 59 and to an OR gate 62.

Output conductor 11 connects programmer 1 to OR gate 62 and to AND gate 46.

Figure 3:
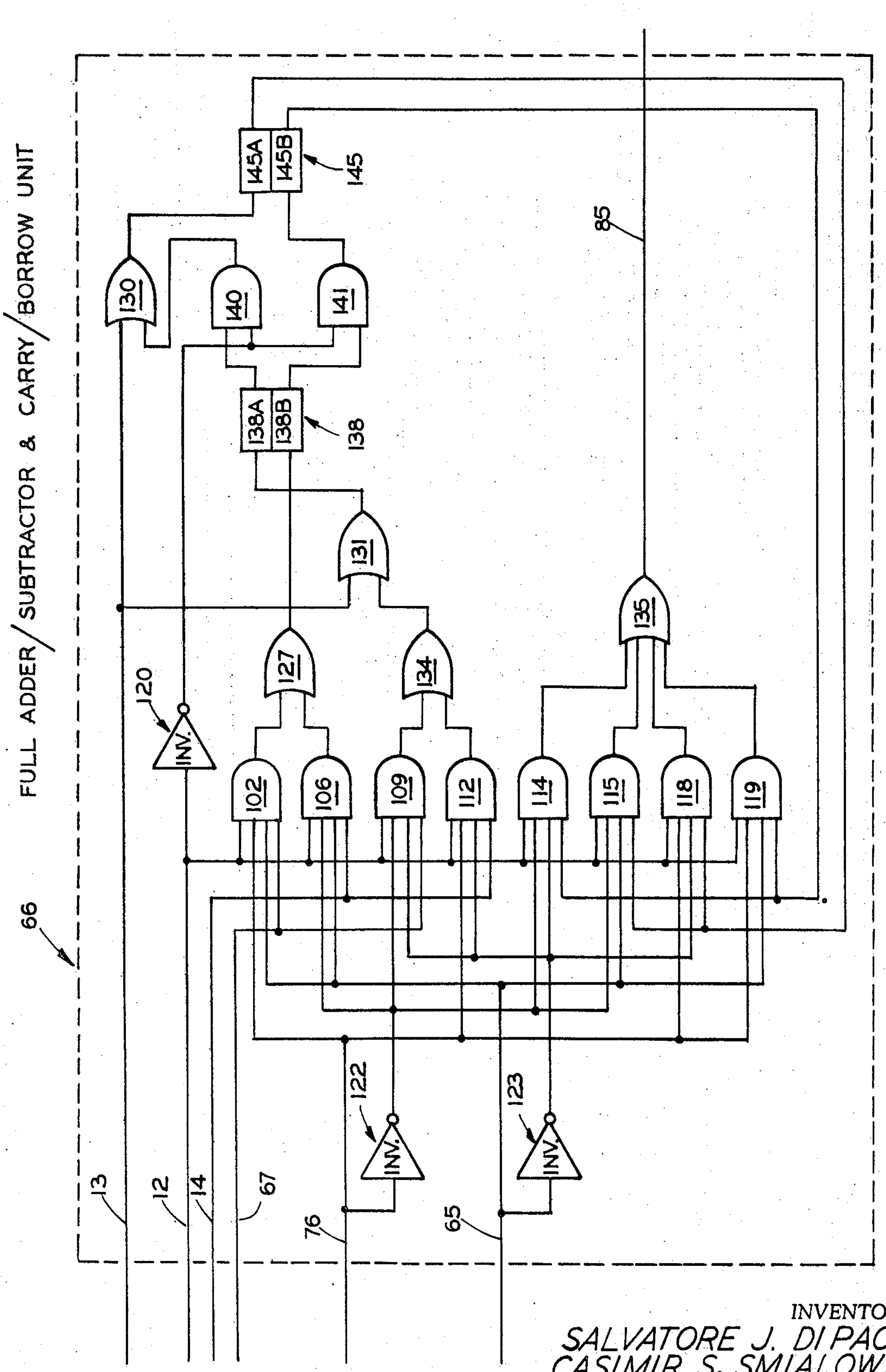

A first input of a full adder/subtractor and carry/borrow unit 66, which may be of a conventional full adder/subtractor type as shown in FIG. 3, is connected to AND gates 55 and 56 through an OR gate 64. Second and third inputs of the adder/subtractor 66 are connected to conductors 12 and 13, respectively, for shifting contents through adder/subtractor 66 and for clearing it. A fourth input connects the adder/subtractor 66 to conductor 14.

Conductor 9 also connects programmer 1 to the AND gate 72 controlling the output of register 24 in response to signals from the programmer 1. The output of AND gate 72 is applied to an OR gate 75.

Conductor 11 is also connected to the AND gate 74 controlling the output of register 20 in response to signals from the programmer 1. The output of AND gate 74 is applied to OR gate 75 whose output is applied to the adder/subtractor 66.

The output of OR gate 49 is applied to an inverter 84. The output of inverter 84 is applied to AND gate 41.

The output of the adder/subtractor 66 is applied to AND gates 43 and 59, through a conductor 85, whose outputs are applied to an OR gate 86. The output of OR gate 86 is applied to the input stage of register 27.

Conductor 11 and the second output register 42 are connected to AND gate 89. The output of AND gate 89 is applied to the input stage of register 27.

Referring to FIG. 3, conductor 12 is connected to AND gates 102, 106, 109, 112, 114, 115, 118 and 119 and to an inverter 120 in the adder/subtractor 66. Conductor 67 is connected to AND gates 102 and 109. Conductor 14 is connected to AND gates 106 and 112. Conductor 76 is connected to AND gates 102, 112, 118 and 119 and to an inverter 122. The output of inverter 122 is applied to AND gates 106, 109, 114 and 115. Conductor 65 is connected to AND gates 102, 106, 115 and 119 and to an inverter 123. The output of inverter 123 is applied to AND gates 109, 112, 114 and 118.

The outputs of AND gates 102 and 106 are applied to an OR gate 127. Conductor 13 is connected to OR gates 130 and 131. The outputs of AND gates 109 and 112 are applied to an OR gate 134 whose output is applied to OR gate 131. The outputs of AND gates 114, 115, 118 and 119 are applied to an OR gate 135 whose output is applied to the adder/subtractor 66 output conductor 85. The output of OR gate 131 is applied to a clear section 138A of flip-flop 138. The output of OR gate 127 is applied to a set section 138B of a flip-flop 138.

Section 138A, of flip-flop 138, output is applied to an AND gate 140 while section 138B output is applied to an AND gate 141. The output of inverter 120 is applied to AND gates 140 and 141. The output of AND gate 140 is applied to OR gate 130 whose output is applied to a clear section 145A of a flip-flop 145. The output of AND gate 141 is applied to a set section 145B of flip-flop 145. Section 145A of flip-flop 145 output is applied to AND gates 115 and 118. Section 145B of flip-flop 145 output is applied to AND gates 114 and 119.

Referring to FIG. 1, conductors 201 and 202 connects the external storage registers and selection means 26 to OR gates 64 and 75, respectively.

OPERATION

Referring to FIG. 1, the digital air data computer 16 computes air data parameters from sensed air conditions based on linear segment approximation of air data curves utilizing the straight line equation (1). If the present altitude $H_{p_1}$ is to be calculated, equation (1) may be rewritten as $$H_{p_1} = m_1 \quad P_{s_1} + b_1 \qquad (2)$$

where the independent variable $P_s$ is the sensed static pressure, $m_1$ is a particular slope and $b_1$ is a particular intercept associated with a pertinent linear segment of the air data curve for $H_p$ on which $H_{p_1}$ is a point.

The sensed conditions of the atmosphere, such as indicated static pressure, total pressure, total temperature and indicated angle of attack from sensors 25 are converted to digital form and stored in storage register and selection means 26. Thus, the digital word for $P_{s_1}$ is stored in means 26. The programmer 1 initially applies a positive "clear" pulse to the conductor 13 which clears registers 20, 24, 27 and 42 and the adder/subtractor 66. The programmer 1 receives the sensed condition in digital form from means 26 and in response applies an address command in the form of pulse trains to register 17 through conductors 3 and 3A to select the proper slope and intercept constants associated with the sensed condition. The quantity of pulses on both conductors equal the number of stages in register 17.

A separate pulse train is applied to register 17 through conductor 4 to shift the address command. Register 17 applies the address command in parallel to the permanent memory 19 through conductor 18.

The applied outputs of register 17 enables only one of the AND gates in the address gating of the memory 19. The address command selects the digital words associated with the particular slope $m_1$ and the intercept $b_1$ for the subsequent calculation.

A positive "dump" pulse is applied by the programmer 1 to the memory 19 through conductor 6. The "dump" pulse is inverted to a negative pulse by the enabled AND gate causing the diodes in the memory 19 to conduct enabling gates in the output gating. The positive "dump" pulse appearing on conductor 6 is applied to the enabled AND gates to provide a pulse output. Since the output of each AND gate in the output gating of memory 19 is connected to the set section input of a flip-flop stage in either register 20 or register 24, the output of memory 19 causes digital words representing the particular slope and intercept parameters to be entered in registers 20 and 24, respectively.

The sensed parameter $\underline{P_{s_1}}$ stored in the storage registers and selection means 26 is transferred to register 27 upon a command from the programmer 1 appearing on output conductor 7.

The programmer 1 applies a high logic level DC voltage shift command to AND gate 48 through conductor 15 thereby enabling it. AND gate 48 controls shifting of the content of register 42 by a 17 pulse train as a function of the shift command. At any other time, the content of register 42 is not affected by that pulse train. During the shift command, there is a low level DC voltage on conductor 11 which is applied to AND gate 89 disabling it and preventing the content of register 27 from being recirculated during shifting. AND gate 89 controls the recirculation of the content of register 27 as a function of a multiplication command and information that the output bit of register 42 is a binary zero. A binary one bit in the output stage of register 42 causes the first and second outputs of register 42 to be at a high level and a low level DC voltage, respectively. A binary zero causes the first and second outputs to be at a low level and a high level DC voltage, respectively. The pulse train of 17 clock pulses, one pulse for each stage of a register, is applied by the programmer 1 to registers 20 and 24; to the adder/subtractor 66; to register 27; to register 42 and AND gate 40, and through AND gate 48 enabled by the shift command. Each pulse of the 17 clocked pulses shifts the content of the registers by one stage. OR gate 47 controls the shifting of register 27 as a function of the 17-pulse train or as a function of a shift pulse which occurs at a time in between the 17-pulse trains. The pulse train, at this time, has no effect on register 20, register 24, and the adder/subtractor 66. However, the pulses applied to register 27, through OR gate 47, causes the content of that register to shift through AND gate 40 to register 42. AND gate 40 is enabled by the pulse train passing through AND gate 48 and OR gate 49. OR gate 49 controls the enabling of AND gate 40, the shifting of register 42 and the disabling of AND gate 41 as a function of a shift command and the 17-pulse train or as a function of a shift pulse and a multiplication command. AND gate 40 controls the transfer of the content of register 27 into register 42 as a function of the conditions imposed on OR gate 49. Upon termination of the pulse train, register 42 contains the former content of register 27 and register 27 is cleared.

At the end of each 17-pulse train, an 18th, shift, pulse appears on conductor 8 and is applied to AND gate 46 and OR gate 47. AND gate 46 applies the shift pulse to OR gate 49 as a function of the multiplication command.

Upon termination of the shift command, the high level DC voltage on conductor 15 changes to a low level disabling AND gate 48. The programmer 1 applies a high level DC voltage to OR gate 62 through conductor 11. OR gate 62 controls the enabling of logic circuitry within adder/subtractor 66, as hereinafter explained, as a function of either a multiplication command or an additional command. OR gate 62 applies the high level DC voltage to adder/subtractor 66 causing it to add the digital information appearing on conductors 65 and 76. The adder/subtractor 66 applies the sum to AND gate 43 through conductor 85. If register 42 has a binary one bit in its output stage, AND gate 43 is enabled by the high level DC voltage of the first output from register 42 and AND gate 43 passes the sum to register 27.

A binary zero bit in the output stage of register 42 disables AND gate 55 since the high DC level second output is inverted by inverter 44. The low level DC first output disables AND gate 43. AND gate 55 blocks the entry of the content of register 27 into the adder/subtractor 66 so that adder/subtractor 66 does not receive any pulses from register 27 which is equivalent to it receiving an input of the digital word for zero. However, the adder/subtractor 66 now has an erroneous output resulting from the addition of the contents of register 20 to the digital word for zero. The disabled AND gate 43 prevents this erroneous sum from entering register 27. Upon termination of the shift command, the voltage on conductor 15 changes to a low level and a high level DC voltage multiplication command appears on output conductor 11 of programmer 1.

A second 17-pulse train appearing on conductor 12 passes through OR gate 47 shifting the content of register 27. AND gate 40 is disabled by the low level DC voltage at terminal 15 which disables AND gate 48 thereby blocking the pulse train to AND gate 40. The content of register 27 is blocked from entering register 42 by AND gate 40 which is disabled by the absence of the pulse train. However, the output of register 27 is applied to AND gate 41. AND gate 41 controls the entry of the content of register 27 into the adder/subtractor 66 as a function of the absence of the shift pulse or the absence of the shift command.

AND gate 41 is enabled by the output of inverter 84 which is the inverted low level DC voltage output of OR gate 49 and passes the content of register 27 to AND gates 55 and 56. AND gate 55 controls the entry of the content of register 27 into the adder/subtractor 66 as a function of the digital character in the output stage of register 42. AND gate 56 controls the entry of the content of register 27 into the adder/subtractor 66 as a function of an addition command. Register 42 is not shifted by the 17-pulse trains since AND gate 48 is disabled. Therefore, the output stage of register 42 will always have the same digital character for the duration of a pulse train that it had at the start of the pulse train. AND gate 55 is enabled when a binary one bit is in the output stage of register 42, and disabled when a binary zero bit is in the output stage as heretofore explained, and hence is controlled by the digital bit in the output stage of register 42. Or gate 64 permits either the content of register 27 or the content of a storage register in the external storage registers and selection means 26 to enter the adder/subtractor 66.

The high level DC voltage multiplication command appearing on conductor 11 enables AND gate 74 which will then pass the content of register 20, when shifted by a pulse train on conductor 12, to OR gate 75 which applies it to the adder/subtractor 66. OR gate 75 permits the content of either register 20, register 24 or a storage register in the external storage registers and selection means 26 to enter the adder/subtractor 66.

The actual multiplication is done by the repeated adding of register 20 content and storing the sum in register 27. The sum is shifted one bit by the shift pulse after each addition, so that the final answer is in a combined register formed by registers 27 and 42. The most significant digits are contained in register 27 with the decimal point occurring between register 27 and register 42. This method of multiplication of binary numbers if fully explained in example 1—14 at page 26 of the text book "Digital Computer Design Fundamentals" by Yaohan Chu which is published by the McGraw-Hill Book Company, Incorporated. It should be noted that register 20 replaces the multiplicand register, register 27 replaces the accumulator, and register 42 replaces the MQ register in the cited example.

Upon termination of the multiplication command, the DC voltage on conductor 11 goes to a low level which disables AND gates 46, 74 and 89. The disabling of AND gate 74 prevents register 20 content from entering the adder/subtractor 66. Meanwhile, a high level DC voltage add command appears on conductor 9 and passes through OR gate 62 into the adder/subtractor 66. The voltage on conductor 9 is also applied to AND gate 56 enabling it. Since AND gates 46 and 48 are disabled by the low level DC voltages on conductors 11 and 15, respectively, OR gate 49 has a low level DC voltage output which is inverted by inverter 84. The output of inverter 84 enables AND gate 41 providing for the content of register 27 to pass through AND gate 41, AND gate 56, enabled as heretofore explained, and OR gate 64 into the adder/subtractor 66. The high level DC voltage appearing on conductor 9 also enables AND gate 72 providing for the content of register 24, when shifted by a pulse train on conductor 12, to pass through AND gate 72 and OR gate 75 into the adder/subtractor 66. AND gate 59 is enabled by the high level DC voltage on conductor 9 and passes the output of the adder/subtractor 66 to OR gate 86 which applies it to register 27 so that upon completion of the addition command, register 27 will contain the sum of the product $mx$ and the intercept $b$.

By way of explanation, table 1 contains all the possible conditions for inputs and outputs of the adder/subtractor 66. It should be noted that although the pulses of the pulse train are not shown in table 1, the transition from the initial condition to the final condition of the flip-flop 145 and from input to output of the adder/subtractor 66 occurs due to the pulses of the 17-pulse train which appears on conductor 12. The character 1 represents binary one, 0 represents binary zero, H.L. represents high level DC voltage, and L.L. represents low level DC voltage.

As an example, if the number three is to be added to the number two, the digital word 011, representing the number three, would appear on conductor 65; while 010, the digital word for the number two, would appear on conductor 76. Conductor 67 would have a high level DC voltage as a result of the application of an add command. For the first bit, the condition is a binary one (1) on conductor 65 and a binary zero (0) on conductor 76 with a high level DC voltage (HL) on conductor 67 and a low level DC voltage (LL) on conductor 14 since a subtract command cannot be present during an addition command. Binary one, in regard to conductors 65, 76 and 85, means the presence of a positive pulse and binary zero means the absence of a positive pulse. The initial condition of flip-flop 145 is binary zero (0); that is, section 145A has a high level DC output, and section 145B has a low level DC output.

TABLE 1.—FULL ADDER/SUBTRACT AND CARRY/BORROW UNIT FUNCTION TABLE

| Input conductors | Initial condition of F/F | Enabled AND gate | Final condition of F/F | Output conductor |
|---|---|---|---|---|
| 65, 67, 76, 14 | 145 | | 145 | 85 |
| (2) 1 H.L., 1 L.L | 0 | 102 | 1 | 0 |
| 0 H.L., 0 L.L | 0 | 109 | 0 | 0 |
| 0 H.L. 1 L.L | 0 | 118 | 0 | 1 |
| (1) 1 H.L. 0 L.L | 0 | 115 | 0 | 1 |
| 1 H.L. 1 L.L | 1 | 102, 119 | 1 | 1 |
| (3) 0 H.L. 0 L.L | 1 | 109, 114 | 0 | 1 |
| 0 H.L. 1 L.L | 1 | None | 1 | 0 |
| 1 H.L. 0 L.L | 1 | None | 1 | 0 |
| 1 L.L. 1 H.L | 0 | None | 0 | 0 |
| 0 L.L. 0 H.L | 0 | None | 0 | 0 |
| 1 L.L. 0 H.L | 0 | 106, 115 | 1 | 1 |
| 0 L.L. 1 H.L | 0 | 110, 118 | 0 | 1 |
| 1 L.L. 1 H.L | 1 | 119 | 1 | 1 |
| 0 L.L. 0 H.L | 1 | 114 | 1 | 1 |
| 1 L.L. 0 H.L | 1 | 106 | 1 | 0 |
| 0 L.L. 1 H.L | 1 | 110 | 0 | 0 |

Referring to table 1, the line marked with (1) in the margin indicates that conductor 65 has a binary one, conductor 76 has a binary zero, a high level DC voltage is present on conductor 67, conductor 14 has a low level DC voltage and the initial condition of the flip-flop 145 is binary zero. The remainder of the line reveals that AND gate 115 is enabled so that a clock pulse can pass through and appear as an output of a binary one on the conductor 85 and flip-flop 145 has a final condition of binary zero.

For the second bit the following condition occurs: a binary one on conductor 65, a binary one on conductor 76, a high level DC voltage on conductor 67, a low level DC voltage on conductor 14 and the initial condition of flip-flop 145 is binary zero. Selecting the line marked with (2) in the margin as meeting those conditions, the line reveals that AND gate 102 is enabled so that a clock pulse applied to it causes flip-flop 145 to have a binary one condition for its final condition; that is, section 145A has a low level DC output and section 145B has a high level DC output, and there is a binary zero output on conductor 85.

For the third bit, there is a binary zero on conductor 65 and a binary zero on conductor 76. There is a high level DC voltage on conductor 67 and a low level DC voltage on conductor 14. The initial condition of flip-flop 145 is binary one representing the carry from the previous additions. The line indicated by (3) in the margin reveals that AND gates 109 and 114 are enabled which causes section 145B of flip-flop 145 to have a high level DC voltage as a final condition and a binary one to appear on conductor 85. As a result, the binary word that appeared on the conductor 85 is 101 which converted to numeric form is 5, 3 + 2 is also 5.

In the calculations of air data, it is some time necessary to subtract one quantity from another quantity. When such a subtraction is necessary, the programmer 1 applies a high level DC voltage to conductor 14 which in turn applies it to the adder/subtractor 66. The content of a register in storage registers and selection means 26, that is the minuend, is applied to conductor 202 which in turn applies it to OR gate 75. OR gate 75 applies the content to the adder/subtractor 66. The content of a second register in storage registers and selection means 26 that is the subtrahend is applied to conductor 201 which applies the contents to OR gate 64. OR gate 64 applies the content to the adder/subtractor 66, which subtracts the content on conductor 65 from the content on conductor 76.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. A computer for providing a digital output corresponding to a condition in accordance with a nonlinear equation, comprising means for sensing the condition and providing a signal corresponding thereto, means for storing slope and intercept constants corresponding to approximate linear segments of the nonlinear equation, a programmer connected to the storing means for selecting the constants of a pertinent linear segment of the nonlinear equation in accordance with the sensed condition, computing means, and control means connecting the sensing means, the storing means, and the programmer to the computing means for applying the condition signal from the sensing means and the constants of the linear segment from the storing means to the computing means in response to commands from the programmer for calculating the parameter in accordance with the pertinent linear segment to provide an output corresponding to the condition in accordance with the nonlinear equation.

2. A computer as defined in claim 1 in which the storing means includes a permanent memory connected to the programmer containing the slope and intercept constants and two registers, and in which the programmer provides signals for transferring selected pertinent slope and intercept constants from the permanent memory to the registers for storage until completion of a calculation.

3. A digital computer as defined in claim 1 in which the computing means is a full adder/subtractor.

4. A computer as defined in claim 1 further comprising a first register connected to the sensing means, to the control means and to the computing means for storing signals corresponding to the condition and for storing data from the computing means in response to the control means, and a second register connected to the first register and to the control means receiving the condition signals from the first register and controlling the control means in accordance with the condition signals.

5. A digital computer as defined in claim 4 which further comprises a readout device connected to the first register for reading the data stored in the first register.

6. A digital computer as defined in claim 4 in which the control means includes switching means for controlling shifting of only one character or the entire contents of the first register to the second register.

7. A digital computer as defined in claim 6 in which the switching means includes a first AND gate connected to the programmer for passing a shift pulse from the programmer in response to an enabling command from the programmer, a second AND gate connected to the programmer for passing a pulse train from the programmer in response to another enabling command from the programmer, and a third AND gate connected to the first and second AND gates and to the first and second registers for controlling transfer of one character from the first register to the second register in response to the shift pulse or the transfer of the entire contents of the first register to the second register in response to the pulse train.

8. A digital computer as defined in claim 4 in which the control means includes switching means for recirculating the contents of the first register while preventing its contents from entering the computing means and preventing the resultant data from the computing means form entering the first register.

9. A digital computer as defined in claim 8 in which the switching means includes a first AND gate connected to the first register, to the programmer and to the computing means for passing the contents of the first register to the computing means in response to signals from the programmer; a second AND gate connected to the first AND gate, the second register and the computing means for passing the contents of the first register to the computing means in response to condition signals from the second register; a first AND gate connected to the computing means and to the first and second registers and controlling the passage of the data from the computing means to the first register in response to condition signals from the second register; and a second AND gate connected to an input and an output of the first register and to the second register and permitting recirculation of the contents of the first register in response to condition signals from the second register.